United States Patent
Sims, Jr.

(10) Patent No.: US 7,694,968 B2
(45) Date of Patent: Apr. 13, 2010

(54) PLAYING CARD VIEWER

(76) Inventor: William A. Sims, Jr., Decatur, AL (US);
William A. Sims, legal representative,
4107 Indian Hills Rd., Decatur, AL (US)
35603

(*) Notice: Subject to any disclaimer, the term of this patent is extended or adjusted under 35 U.S.C. 154(b) by 478 days.

(21) Appl. No.: 11/653,922

(22) Filed: Jan. 17, 2007

(65) Prior Publication Data

US 2008/0170313 A1 Jul. 17, 2008

(51) Int. Cl.
*A63B 71/00* (2006.01)
*A63F 9/00* (2006.01)

(52) U.S. Cl. .................................. 273/148 R

(58) Field of Classification Search .................. 359/857, 359/850, 855, 856; 472/73; 273/148 R, 273/309
See application file for complete search history.

(56) References Cited

U.S. PATENT DOCUMENTS

| | | | |
|---|---|---|---|
| 1,643,626 A * | 9/1927 | May ........................... 359/857 |
| 2,046,595 A | 7/1936 | Yerkes ........................ 273/136 |
| 3,165,319 A | 1/1965 | Benima ....................... 273/149 |
| 3,742,616 A | 7/1973 | Heller ........................... 35/8 R |
| 3,779,554 A | 12/1973 | Brix ........................ 273/131 B |
| 3,817,530 A * | 6/1974 | Howard ...................... 273/281 |
| 3,858,797 A | 1/1975 | Takeuchi ................ 235/61.11 R |
| 4,146,229 A | 3/1979 | Morse ......................... 273/150 |
| D317,951 S | 7/1991 | Miller .......................... D21/57 |
| 5,039,102 A | 8/1991 | Miller ..................... 273/148 R |
| 5,362,053 A | 11/1994 | Miller ..................... 273/148 R |
| 5,374,061 A | 12/1994 | Albrecht ................. 273/149 R |
| 5,451,054 A * | 9/1995 | Orenstein .............. 273/148 R |
| 5,632,483 A | 5/1997 | Garczynski et al. ...... 273/148 R |
| 5,669,817 A | 9/1997 | Tarantino ..................... 463/13 |
| 5,681,039 A | 10/1997 | Miller ..................... 273/148 R |
| 5,950,640 A * | 9/1999 | Duncan et al. .............. 132/305 |
| 6,676,517 B2 | 1/2004 | Beavers ........................ 463/25 |
| D526,480 S * | 8/2006 | Nuttall ........................ D3/247 |
| 7,478,813 B1 * | 1/2009 | Hofferber et al. ........ 273/148 A |
| 2003/0052448 A1 | 3/2003 | Bertrand ................. 273/148 R |
| 2003/0236113 A1 | 12/2003 | Webb .......................... 463/11 |
| 2005/0137005 A1 | 6/2005 | Soltys et al. .................. 463/13 |
| 2005/0152046 A1* | 7/2005 | Gruner et al. ............... 359/726 |
| 2006/0163808 A1* | 7/2006 | Belill ......................... 273/150 |

* cited by examiner

*Primary Examiner*—Alessandro Amari
(74) *Attorney, Agent, or Firm*—Guice Patents PLLC

(57) ABSTRACT

A card viewer having a main body having a cover with at least one transparent portion, a first reflective surface, and a second reflective surface. The image of the first side of the card is received by the second reflective surface, transferred from the second reflective surface to the first reflective surface, and observed on the first reflective surface from the location above a second side of the card through a single transparent portion of the at least one transparent portion. The viewer can include at least one clamping device to secure the viewer to an object or the viewer can be made integrally with the object.

20 Claims, 9 Drawing Sheets

PLAYING CARD VIEWER

FIELD OF THE INVENTION

The present invention relates to a portable viewer for viewing a face of a playing card without picking the card up while a user is in sitting, standing, or reclining positions.

BACKGROUND OF THE INVENTION

Known card viewers allow a user or a third party to view a face of a playing card placed face down on a top of the viewer. However, these conventional viewers are very complex, having numerous mirrors and transparent viewing portions making them impractical and difficult to manufacture at a reasonable cost. These known viewers do not enable the user to view a visually correct image of the card received by a first mirror through a single transparent portion.

The conventional viewing systems teach fixing a plurality of viewers to a table for use by all players of a group of players. There exists a need for a playing card viewer that is portable and readily attachable to a table to enable persons who are unable to sit or stand for sustained periods of time to participate in playing card games from a sitting or even a reclining position.

SUMMARY OF THE INVENTION

The object of the present invention is to provide a card viewer for viewing a face of the card while the card is located face down on a flat surface of the viewer. The viewer could be used to view any object, including printed material, photographs and pictures by sizing the viewing window for a specific application.

Another object of the present invention is to provide a portable viewer that is attachable to a table, chair, bed, or other object enabling the viewer to be used by a person who is sitting, standing, reclining, or laying down.

Another object of the present invention is to provide a viewer that is integrally made with the table, chair, bed, or another object.

Another object of the present invention is to provide a viewer device wherein an image of the object on the viewer is received by first and second reflective surfaces and observed by the user through a single transparent portion.

Another object of the present invention is to provide a card viewer with a lighting device illuminating the card to make the card more visible.

DETAILED DESCRIPTION OF THE PREFERRED EMBODIMENT

Figure 1:
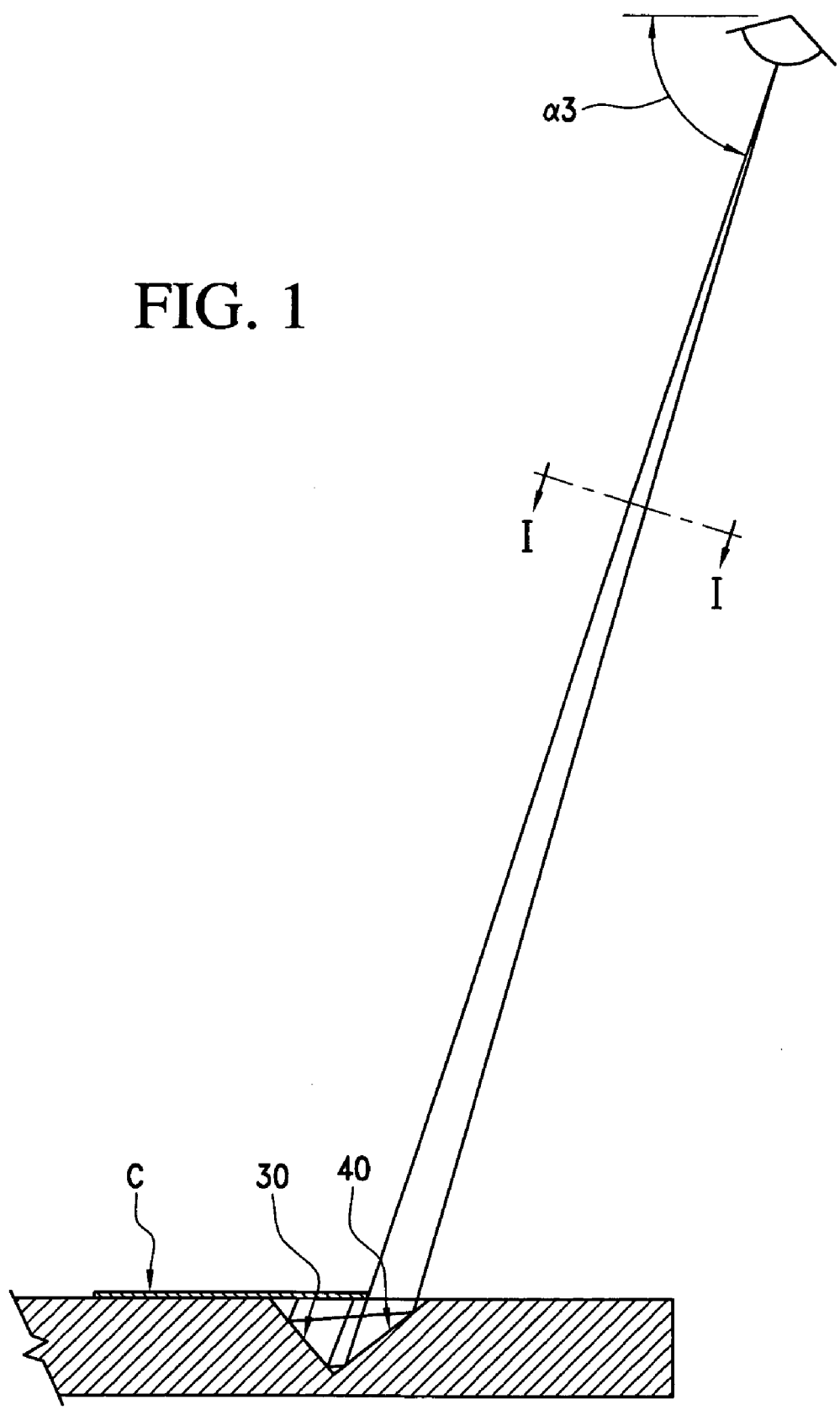
FIG. 1 is a schematic side view of the present invention.
Figure 2:
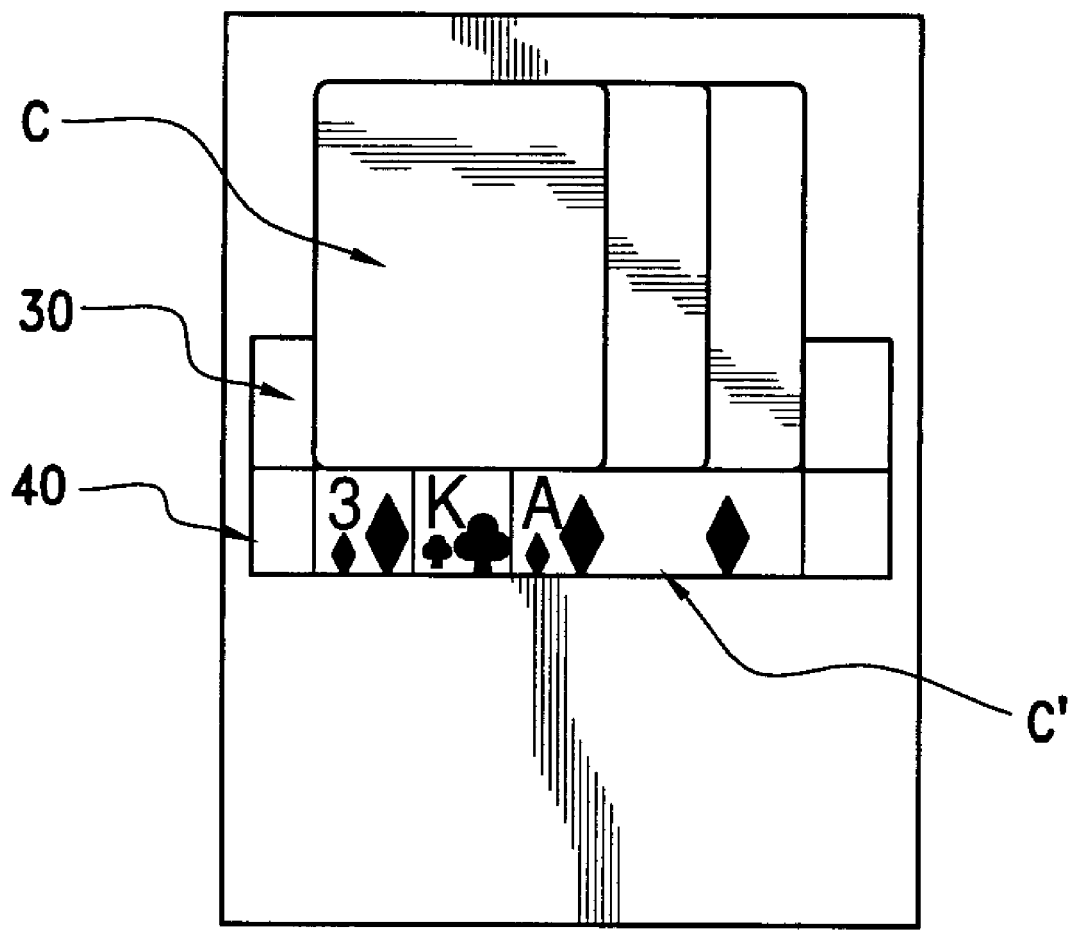
FIG. 2 is a schematic top view of the present invention from section I-I.

FIGS. 1-9 illustrate a card viewer for viewing a face of a playing card C or other object while the card is located face down on a flat surface of the viewer. The viewer will be disclosed in conjunction with its use with a playing card, but it is to be understood that it will work equally well with other objects including printed material, photographs and pictures.

As shown in FIGS. 3-6, the viewer includes a main body 10, a cover 20, a first reflective surface 30, and a second reflective surface 40. The main body 10 has two outer sides 11, 12, a bottom 13, a front 14, a back 15, a top 16, and a recess 17. The recess 17 includes a front recess surface 171 and a back recess surface 172. The main body can be made of any man-made or natural material capable of supporting the reflective surfaces 30, 40 including but not limited to wood, plastic, metal, or resin.

The cover 20 has at least one transparent portion 21 or can be made entirely of a transparent material. The cover 20 is located on the top 16 of the main body 10. An uppermost surface of the cover 20 and an uppermost surface of the table T are preferably located in a common plane. The at least one transparent portion 21 can include a magnification portion for magnifying the face of the playing card C.

The first reflective surface 30 is located on back recess surface 172 and positioned at a first angle α1 relative to the cover 20, which is between 40 degrees and 90 degrees, and preferably 75 degrees.

The second reflective surface 40 is located on the front recess surface 171 and positioned at a second angle α2 relative to the first reflective surface 30, the second angle α2 being between 60 degrees and 90 degrees, and preferably 90 degrees.

The first reflective surface 30 and the second reflective surface 40 can be made of any reflective material including glass, plastic, polyester, or metal with a reflective surface or coating. The first reflective surface 30 and the second reflective surface 40 can be integrally made from a single piece that is bent at the desired angle α2.

Two reflective surfaces are required to see the image of the playing card C as if it were being viewed directly without mirrors. An initial reflective surface is used to reverse and invert the image a first time and a visible reflective surface is used to reverse an invert the image a second time. When the initial reflective surface and the visible reflective surface are used, the image of the playing card C seen by the user will be oriented as if it were being viewed directly without mirrors.

In the preferred embodiment, when the second angle α2 is 90 degrees, an image C' of the playing card C is received by the first reflective surface 30, transferred from the first reflective surface 30 to the second reflective surface 40, and observed by a user on the second reflective surface 40 through the at least one transparent portion 21 of the cover 20. In this configuration, the first reflective surface 30 is the initial reflective surface and the second reflective surface 40 is the visible reflective surface. See FIG. 1.

In another embodiment, when the second angle α2 is less than 90 degrees, an image of the playing card C is received by the second reflective surface 40, transferred from the second reflective surface 40 to the first reflective surface 30, and observed by a user on the first reflective surface 30 through the at least one transparent portion 21 of the cover 20. In this configuration, the second reflective surface 40 is the initial reflective surface and the first reflective surface 30 is the visible reflective surface. See FIG. 9.

In use, the viewer could be used for viewing a face down surface of the card C while the card is located on the flat top surface of the viewer. The user is best positioned at a viewing angle α3 relative to the cover 20. The viewing angle α3 is preferably between 45 degrees and 50 degrees.

In another embodiment, the second reflective surface 40 can be omitted, and the image of the playing card C is received by the first reflective surface 30 and observed by a user on the first reflective surface 30 through the at least one transparent portion 21 of the cover 20. However, when only a single reflective surface is used (i.e., the first reflective surface 30), the user will see an inverted and reversed image of the object being viewed. When the viewer uses a single reflective surface (i.e., only the first reflective surface 30), the preferred first angle α1 is 55 degrees.

Figure 6:
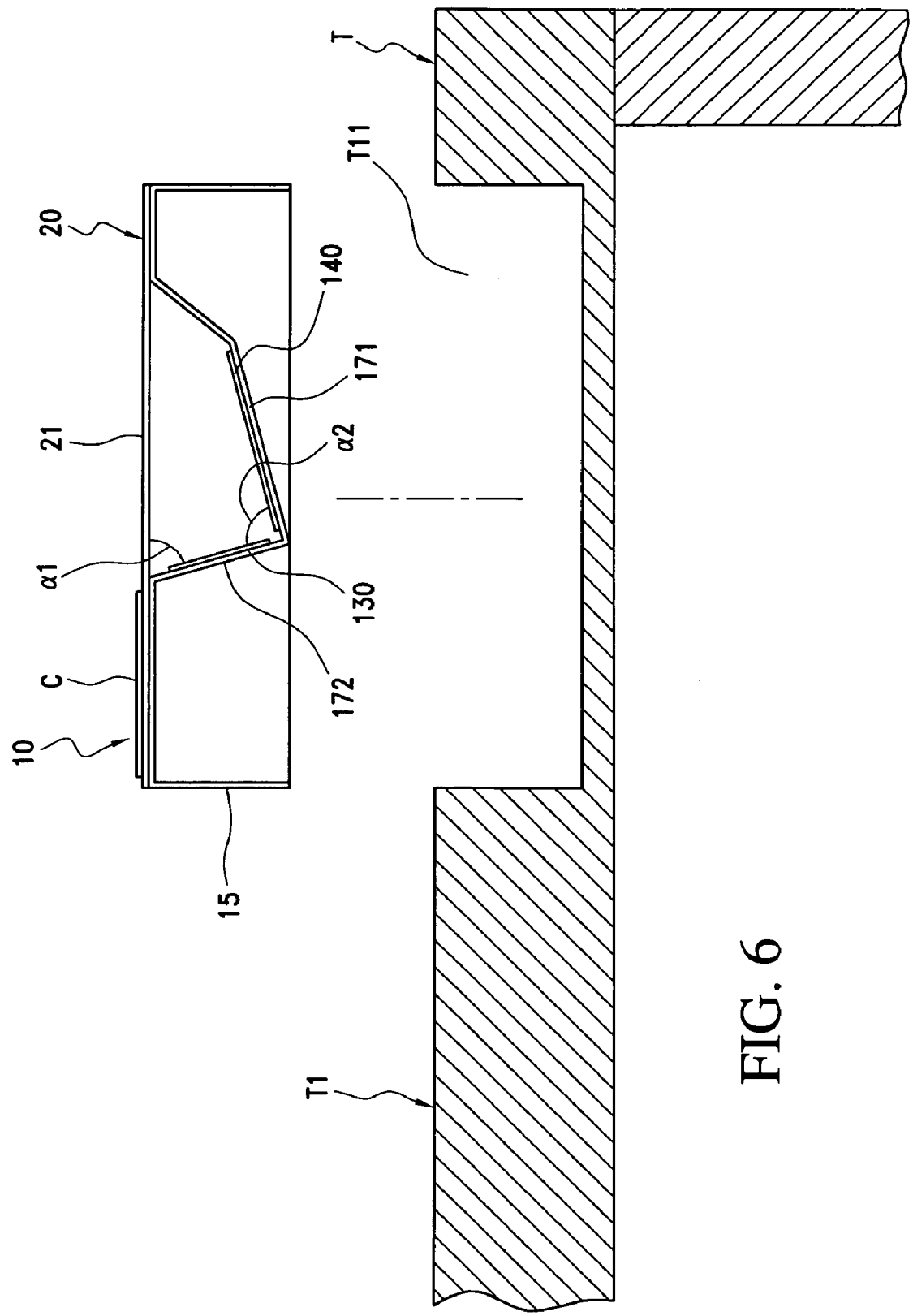
FIG. 6 is an exploded cross-sectional side view of the present invention.
Figure 8:
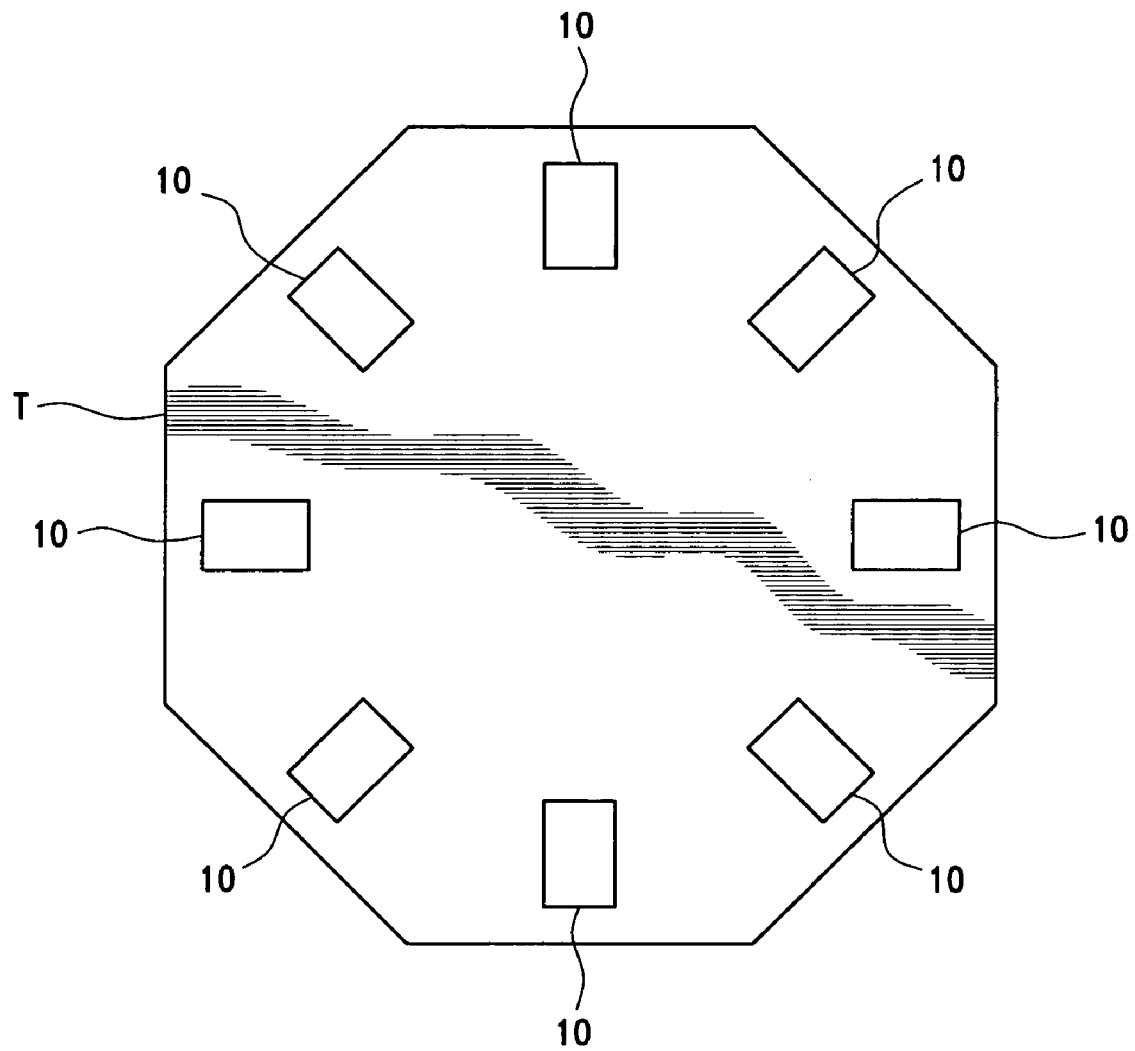
FIG. 8 is a top view of the present invention located in a table.

As best seen in FIGS. 6 and 8, the viewer main body 10 is inserted into an opening T11 in a table top T1 of the table T. The viewer main body 10 can be either fixed to the table T or removably inserted into the opening T11 in the table top T1 of the table T. In a preferred embodiment, the uppermost surface of the cover 20 of the viewer is positioned flush with the uppermost surface of the table top T1. The opening T11 has a size and depth accommodating and positioning the cover 20 relative to the table top T1. It is to be understood that instead of the table T, the viewer may be located in a surface connected to a portable tray, a bed, a chair, a couch, or other suitable object.

Figure 7:
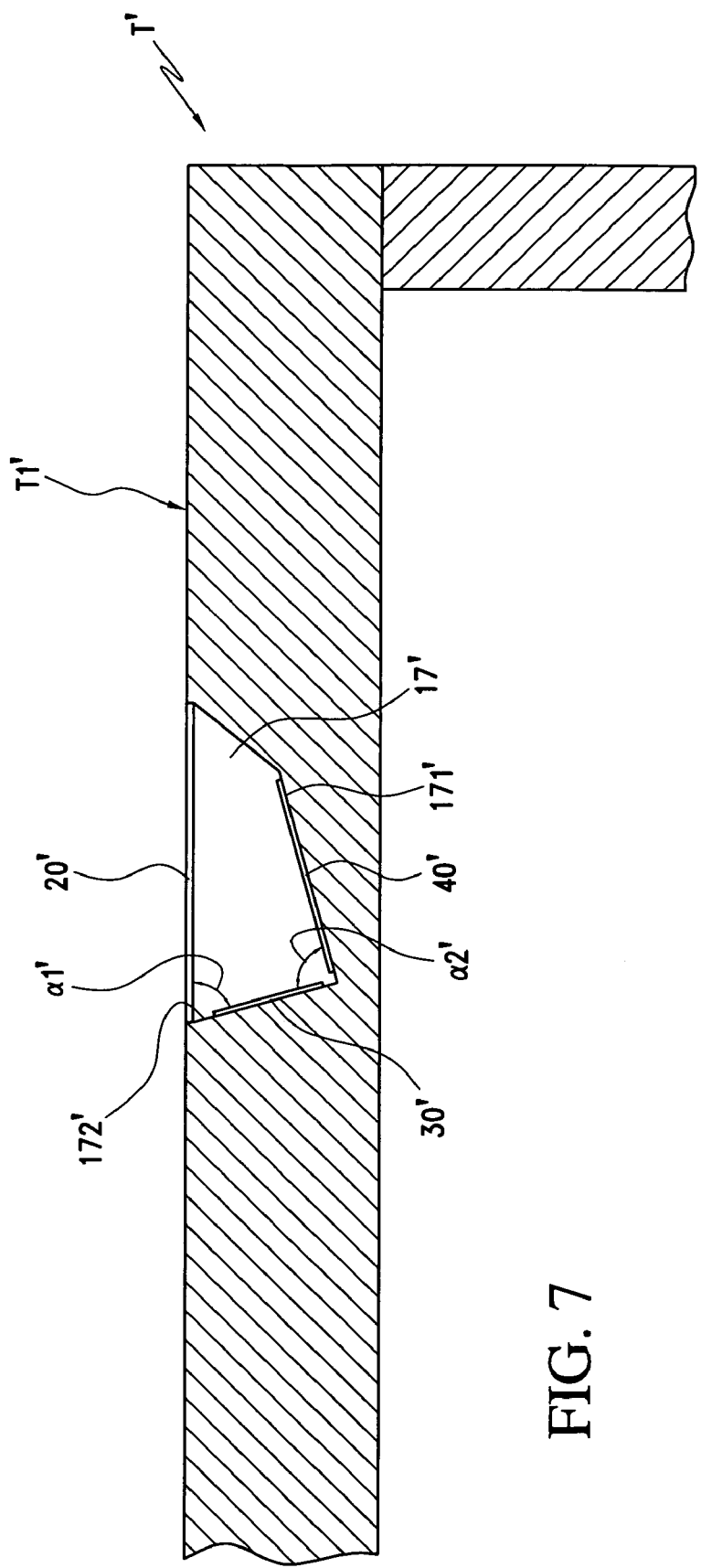
FIG. 7 is a cross-sectional side view of the present invention integrally made with a table.

As illustrated in FIG. 7, in an alternative embodiment of the present invention the viewer can be integrally made with a table T'. In this view, a recess 17' is formed directly in a table top T1' of the table T'. The recess 17' includes a front recess surface 171' and a back recess surface 172'. The front recess surface 171' is located at a first angle α1' relative to a cover 20', which is between 40 degrees and 75 degrees, and preferably 75 degrees. The back recess surface 172' is located at a second angle α2' relative to the first reflective surface 30, the second angle α2' being between 60 degrees and 90 degrees, and preferably 90 degrees. A first reflective surface 30' is located on back recess surface 172', and a second reflective surface 40' is located on the front recess surface 171'.

Figure 4:
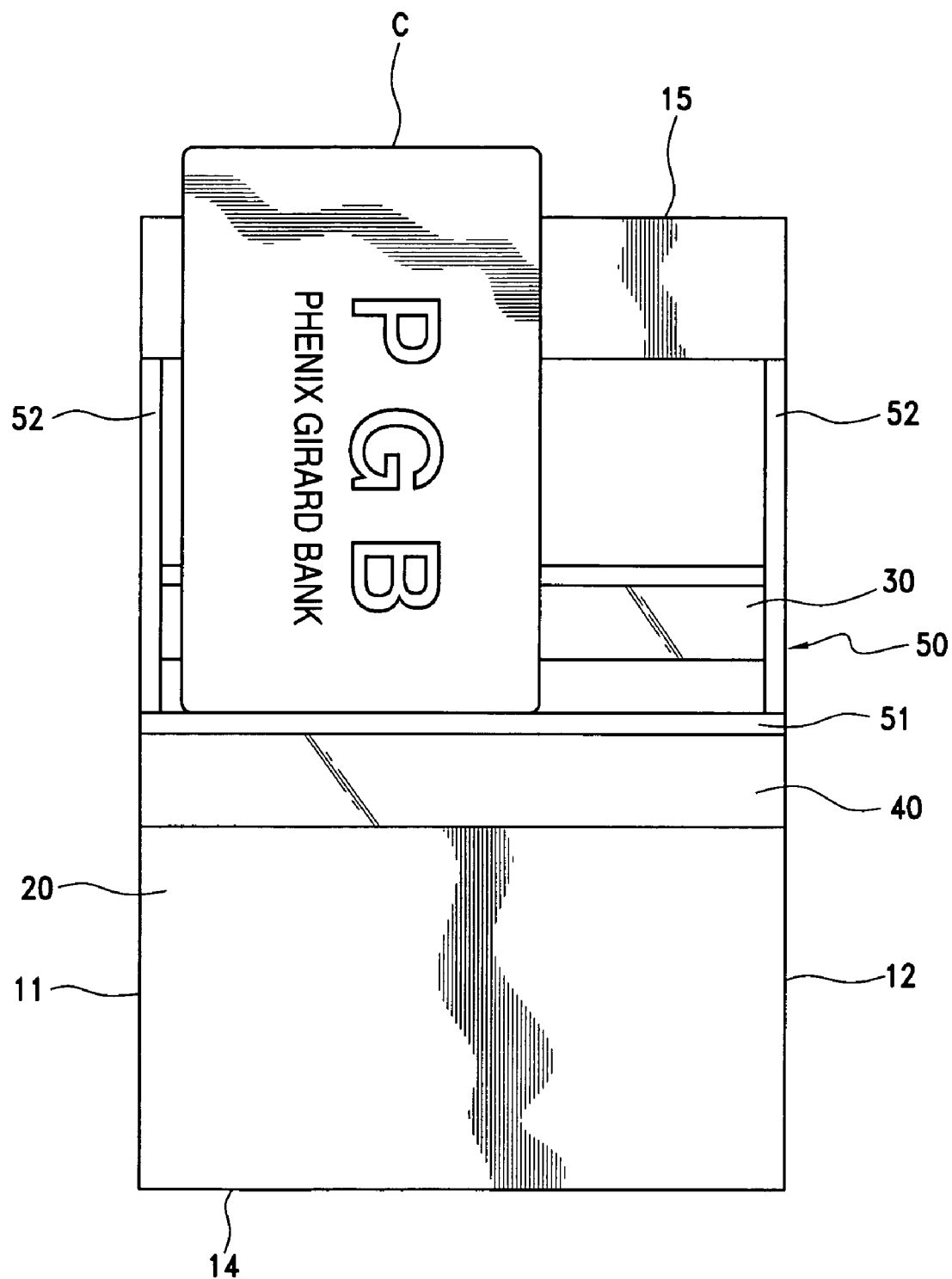
FIG. 4 is a top view of the present invention with a card stop located in an open position.
Figure 5:
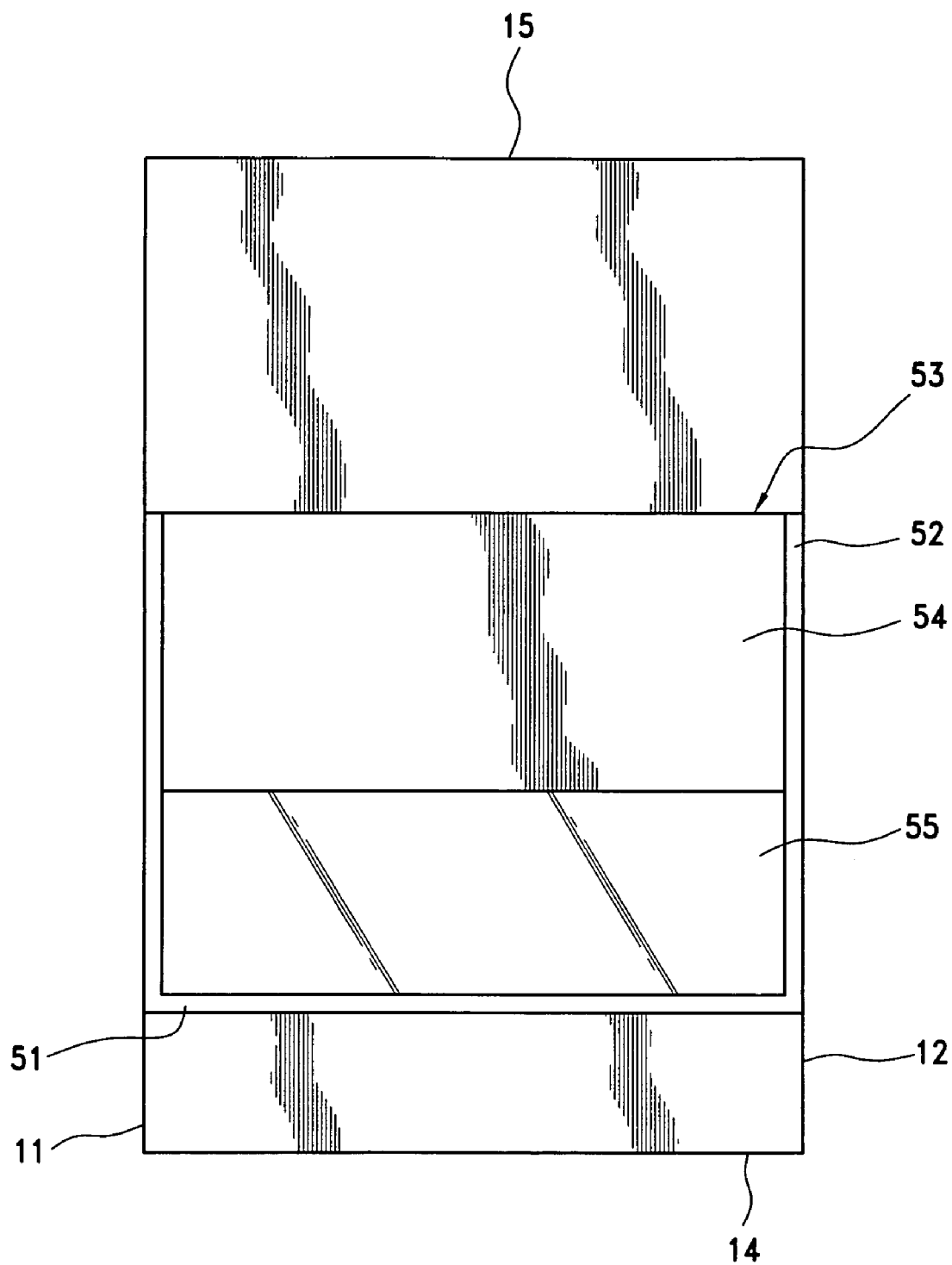
FIG. 5 is a top view of the present invention with a card stop located in a closed position.

As shown in FIGS. 4 and 5, the viewer can also include a card stop 50 located above the cover 20. The card stop can include a front piece 51, two side pieces 52, and a card stop bottom 53. One of the two side pieces 52 is connected to each of two opposing ends of the front piece 51. The card stop bottom 53 includes a non-transparent portion 54 and a transparent portion 55. The image of the playing card C is not visible through the non-transparent portion 54, but is visible through the transparent portion 55. The card stop 50 can be used as a positioning device aligning the playing card C or a group of playing cards in a predetermined position relative to the first and the second reflective surfaces 30, 40.

The card stop can also be movable along an upper surface of the cover 20 between first and second positions. When the card stop 50 is located in the first position, the card stop 50 is moved forwardly toward the front 14 of the main body 10 locating the non-transparent portion 54 above the at least one transparent portion 21 of the cover 20 and preventing the image of the playing card C from being seen by the user. See FIG. 5. When the card stop 50 is located in the second position, the card stop 50 is moved rearwardly toward the back 15 of the main body 10 aligning the playing card C with the first and the second reflective surfaces 30, 40 allowing the image C' of the playing card C to be seen by the user. When the card stop 50 is located in the second position, the transparent portion 55 is located above the at least one transparent portion 21 of the cover 20 allowing the image of the playing card C to be seen by the user through the transparent portion 55. See FIG. 4.

As shown in FIG. 8, a plurality of main bodies 10 are located on a table surface or inserted into a plurality of openings in a table T to accommodate a plurality of users playing a card game.

Figure 3:
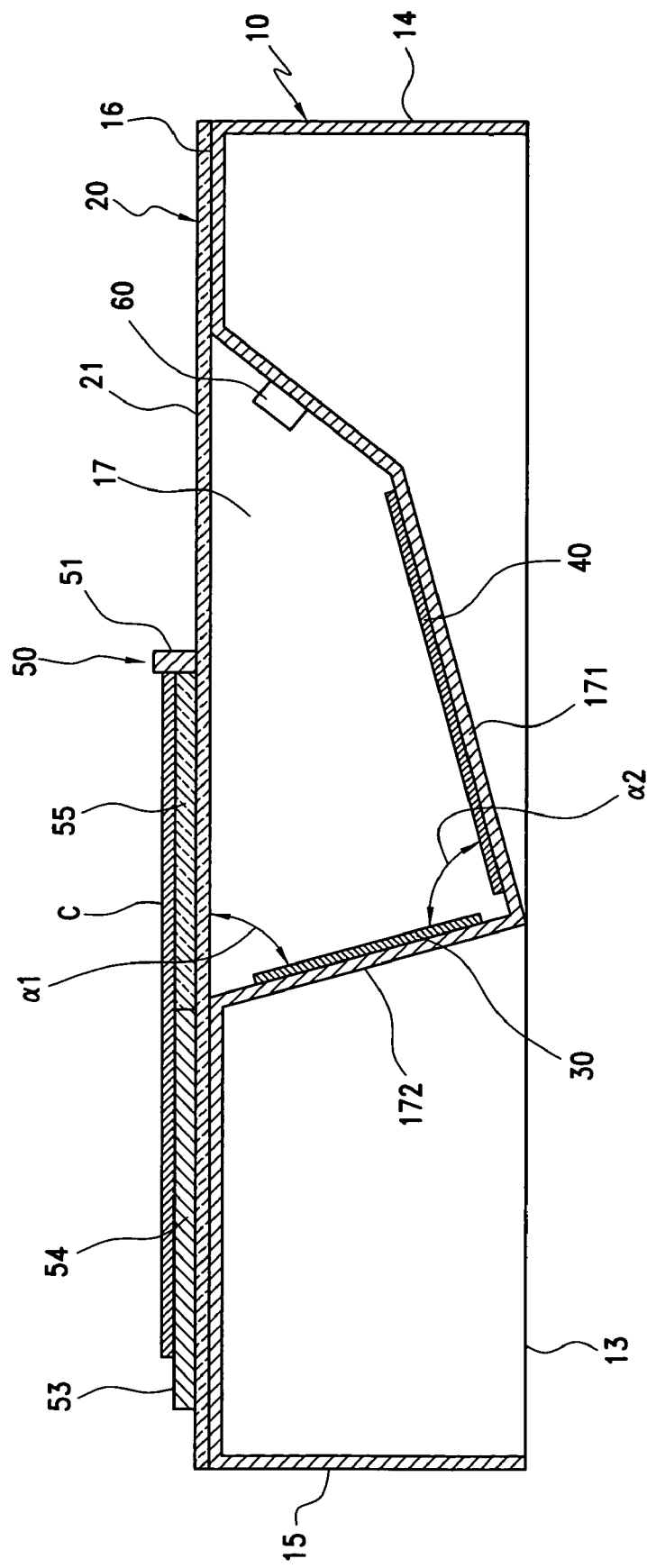
FIG. 3 is a section view of the present invention.
Figure 9:
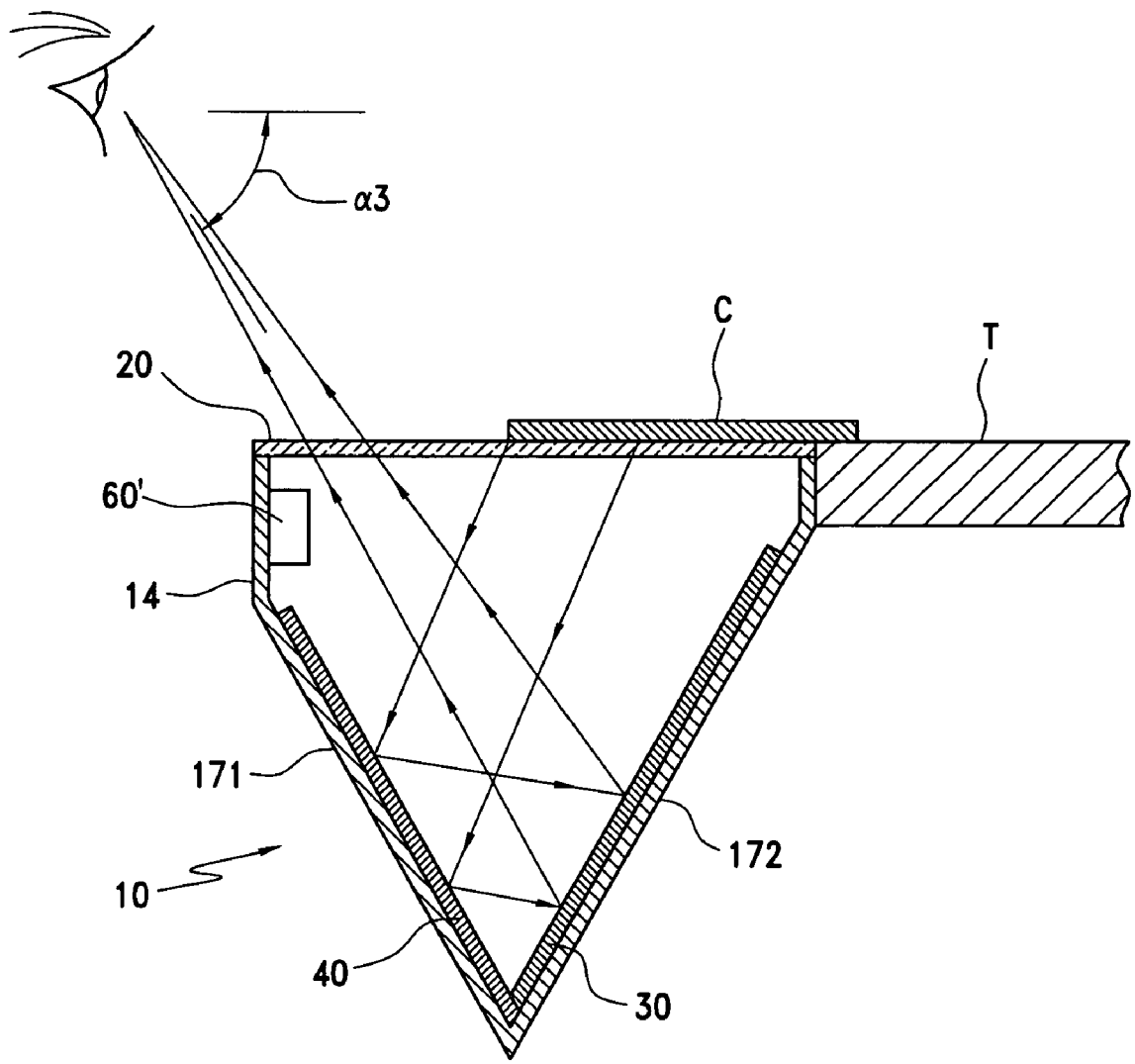
FIG. 9 is a schematic side view of a portable version of the present invention attached to a table.

As shown in FIGS. 3 and 9, the viewer can also include a light 60, 60' illuminating the face of the playing card C. The light 60, 60' can be adjustable or fixed, but is preferably located in an interior of the main body 10. Although the light 60, 60' can be positioned at any location within the recess 17 of the main body 10 or on an exterior of the main body 10 to illuminate the face down surface of the card C. The light can be powered by batteries or through a power cord connected to a power source.

The viewer can be sized to satisfy specific requirements for a variety of applications. For example, the viewer could have a smaller size for viewing a single card and a larger size for viewing multiple cards simultaneously or for viewing a larger object.

While the present invention has been illustrated and described in detail with respect to the preferred embodiments thereof, numerous modifications and variations could be made thereto by those skilled in the art without departing from the scope and spirit of the invention set forth in the claims.

The invention claimed is:

1. A viewer for viewing a face down first side of a card from a location above a second side of the card opposite the first side, the viewer comprising:
   a) a main body having a cover, the cover having at least one transparent portion;
   b) a first reflective surface located in the main body and positioned at a first angle relative to the cover, wherein the first angle is less than 90 degrees; and
   c) a second reflective surface located in the main body facing toward the cover, located adjacent to the first reflective surface, and positioned at a second angle relative to the first reflective surface;
   wherein an image of the first side of the card is received by the second reflective surface through a single transparent portion of the at least one transparent portion, transferred to the first reflective surface, and observed on the first reflective surface from the location above a second side of the card through the single transparent portion of the at least one transparent portion;
   wherein the second angle is less than 90 degrees.

2. The viewer according to claim 1, wherein the first angle is between 40 degrees and 90 degrees.

3. The viewer according to claim 1, wherein the cover is made of a transparent material.

4. The viewer according to claim 1, wherein the main body includes a front recessed surface and a back recessed surface, the first reflective surface is located on the back recessed surface and the second reflective surface is located on the front recessed surface.

5. The viewer according to claim 1, further comprising a card stop located on the cover.

6. The viewer according to claim 5, wherein the card stop includes a front piece.

7. The viewer according to claim 6, wherein the card stop includes two side pieces, one of the two side pieces is connected to each of two opposing ends of the front piece.

8. The viewer according to claim 1, further comprising a card stop located on the cover and adjustable between first and second positions, wherein, when the card stop is located in the first position, an image of the first side of the card is visible through the single transparent portion of the at least one transparent portion, and, when the card stop is located in the second position, the card stop covering the first reflective surface and the second reflective surface preventing the image of the first side of the card from being seen through the single transparent portion of the at least one transparent portion.

9. The viewer according to claim 1, further comprising a light located in an interior of the main body.

10. The viewer according to claim 1, wherein the first reflective surface is located in a rear portion of the main body, the second reflective surface is located in a front portion of the main body, and the card is positioned directly above the first reflective surface at a position located above the rear portion of the main body, and wherein a path of the image of the first side of the card being reflected from the first side of the card to the second reflective surface crosses a path of the image being reflected from the first reflective surface to the location above the second side of the card.

11. A viewer for viewing a face down first side of a card from a location above a second side of the card opposite the first side, the viewer comprising:

a) a main body having a cover, the cover having at least one transparent portion;

b) a first reflective surface located in the main body and positioned at a first angle relative to the cover, wherein the first angle is less than 90 degrees; and c) a second reflective surface located in the main body facing toward the cover, located adjacent to the first reflective surface, and positioned at a second angle relative to the first reflective surface;

wherein an image of the first side of the card is received by the second reflective surface through a single transparent portion of the at least one transparent portion, transferred to the first reflective surface, and observed on the first reflective surface from the location above a second side of the card through the single transparent portion of the at least one transparent portion;

wherein the first angle is 75 degrees.

12. The viewer according to claim 11, wherein the second angle is 90 degrees.

13. A viewer for viewing a face down first side of a card from a location above a second side of the card opposite the first side, the viewer comprising:

a table having at least one recess, each of the at least one recess having:

a) a cover covering a top thereof, the cover having at least one transparent portion;

b) a first reflective surface located below the cover and positioned at a first angle relative to the cover, wherein the first angle is less than 90 degrees; and c) a second reflective surface located below the cover adjacent to the first reflective surface, and positioned at a second angle relative to the first reflective surface, the first reflective surface and the second reflective surface facing toward the cover;

wherein an image of the first side of the card is received by the second reflective surface through a single transparent portion of the at least one transparent portion, transferred to the first reflective surface, and observed on the first reflective surface from the location above a second side of the card through the single transparent portion of the at least one transparent portion;

wherein the first angle is 75 degrees.

14. The viewer according to claim 13, wherein the cover is made of a transparent material.

15. The viewer according to claim 13, wherein the second angle is 90 degrees.

16. The viewer according to claim 13, further comprising at least one card stop located on the cover of each of the at least one recess.

17. The viewer according to claim 13, further comprising a light located in each of the at least one recess.

18. The viewer according to claim 13, wherein the table has at least two recesses.

19. The viewer according to claim 13, wherein the first reflective surface is located in a rear portion of the at least one recess, the second reflective surface is located in a front portion of the at least one recess, and the card is positioned directly above the first reflective surface at a position located above the rear portion of the at least one recess, and wherein a path of the image of the first side of the card being reflected from the first side of the card to the second reflective surface crosses a path of the image being reflected from the first reflective surface to the location above the second side of the card.

20. A viewer for viewing a face down first side of a card from a location above a second side of the card opposite the first side, the viewer comprising:

a table having at least one recess, each of the at least one recess having:

a) a cover covering a top thereof, the cover having at least one transparent portion;

b) a first reflective surface located below the cover and positioned at a first angle relative to the cover, wherein the first angle is less than 90 degrees; and c) a second reflective surface located below the cover adjacent to the first reflective surface, and positioned at a second angle relative to the first reflective surface, the first reflective surface and the second reflective surface facing toward the cover;

wherein an image of the first side of the card is received by the second reflective surface through a single transparent portion of the at least one transparent portion, transferred to the first reflective surface, and observed on the first reflective surface from the location above a second side of the card through the single transparent portion of the at least one transparent portion;

wherein the second angle is less than 90 degrees.

* * * * *

UNITED STATES PATENT AND TRADEMARK OFFICE
CERTIFICATE OF CORRECTION

PATENT NO. : 7,694,968 B2  Page 1 of 1
APPLICATION NO. : 11/653922
DATED : April 13, 2010
INVENTOR(S) : William A. Sims and William A. Sims, Jr.

It is certified that error appears in the above-identified patent and that said Letters Patent is hereby corrected as shown below:

On the Title Page

Item (12) should read:   Sims et al.

Item (76) Inventors should read:   Dr. William A. Sims, Decatur, AL (US)
William A. Sims, Jr., Brentwood, TN (US)

Signed and Sealed this

Eighth Day of June, 2010

David J. Kappos
*Director of the United States Patent and Trademark Office*